United States Patent Office 2,902,517
Patented Sept. 1, 1959

2,902,517

PREPARATION OF MONO- AND DIARYLPHOSPHINES

Louis Schmerling, Riverside, Ill., assignor, by mesne assignments, to Universal Oil Products Company, Des Plaines, Ill., a corporation of Delaware No Drawing. Application June 22, 1955
Serial No. 517,370

11 Claims. (Cl. 260—606.5)

This invention relates to a process for preparing mono- and diarylphosphines, and more particularly to a process for obtaining higher yields of the aforementioned compounds.

It is known that the reaction of an aromatic compound such as benzene with phosphorus trichloride in the presence of a Friedel-Crafts type catalyst such as aluminum chloride will yield aryldichlorophosphines, together with smaller amounts of diarylchlorophosphines.

It is an object of this invention to obtain mono- and diarylphosphines instead of chlorophosphines from the reaction between an aromatic compound and phosphorus trichloride by carrying out the reaction in the presence of a saturated hydrocarbon.

One embodiment of the invention resides in a process for the preparation of a phosphine containing at least one aryl substituent but not more than two aryl substituents by reacting an aromatic compound with phosphorus trichloride in the presence of a Friedel-Crafts type catalyst and a saturated hydrocarbon, and recovering the resultant arylphosphine.

A specific embodiment of the invention is found in a process for the preparation of a phosphine selected from the group consisting of monoarylphosphines and diarylphosphines by reacting an aromatic compound with phosphorus trichloride in the presence of aluminum chloride and a saturated hydrocarbon containing a tertiary carbon atom, and recovering the resultant arylphosphine.

A more specific embodiment of the invention resides in a process for the preparation of an arylphosphine by reacting benzene with phosphorus trichloride in the presence of aluminum chloride and methylcyclohexane, and recovering the resultant phenylphosphine and diphenylphosphine.

Other objects and embodiments referring to alternative aromatic compounds and alternative saturated hydrocarbons containing a tertiary carbon atom will be found in the following detailed description of this invention.

It is now proposed to prepare mono- and diarylphosphines by reacting phosphorus trichloride with an aromatic compound in the presence of a saturated hydrocarbon containing a tertiary carbon atom or a saturated hydrocarbon capable of being isomerized to such a compound under the conditions of the reaction. The resultant monoarylphosphine dichloride (i.e., monoarydichlorophosphine) and diarylphosphine chloride (i.e., diarylchlorophosphine) which would otherwise be formed is reduced to monoarylphosphine and diarylphosphine respectively. For example, when benzene is reacted with phosphorus trichloride in the presence of aluminum chloride and methylcyclohexane, the formation of phenylphosphine will proceed according to the following equations:

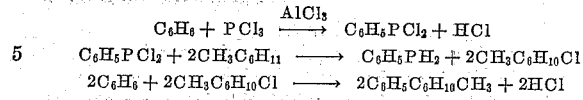

The preparation of a diphenylphosphine can be illustrated by the following equations:

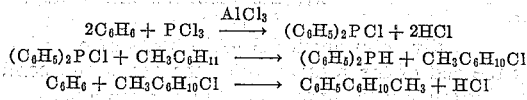

The monarylphosphines and diarylphosphines which result from this reaction, many of which are well-known compounds, may be used as intermediates in the preparations of pharmaceutical compounds, insecticides, and certain toxic products. For example, phenylphosphine, as such, or as its oxidation product, phenylphosphonous acid, may be used as an antioxidant in gasoline and other oils.

Aromatic compounds which may be utilized in the present process include aromatic hydrocarbons such as benzene toluene, m-xylene, p-xylene, o-xylene, ethylbenzene, propolybenzene, butylbenzene, etc.; fused ring compounds such as naphthalene, anthracene, phenanthrene, etc., and their alkyl derivatives. Substituted aromatic compounds including halogenated benzenes such as chlorobenzene, bromobenzene, fluorobenzene, iodobenzene, dichlorobenzenes, trichlorobenzenes, tetrachlorobenzenes, etc., along with aromatic compounds containing hydroxy and amino substituents such as phenols and aniline, etc., may also be used but not necessarily with equivalent results. It is to be understood that the above mentioned compounds are only representative of the classes of compounds which may be used in this invention, and said invention is not necessarily limited thereto.

The saturated hydrocarbons which may be used include paraffins and cycloparaffins containing tertiary carbon atoms as well as hydrocarbons which may be isomerized to such tertiary carbon atom containing hydrocarbons under the reaction conditions. These hydrocarbons include isobutane, isopentane, 2-methylpentane, 2-methylhexane, 2,3-dimethylbutane, etc.; cyclohexane, methylcyclopentane, ethylcyclopentane, propylcyclopentane, methylcyclohexane, ethylcyclohexane, propylcyclohexane, 1,2 - dimethylcyclopentane, 1,2 - diethylcyclopentane, 1,2 - methylcyclohexane, 1,2 - ethylcylohexane, decahydronaphthalene, etc. n-Alkanes such as n-butane and n-pentane and cyclohexane may also be used under conditions favorable to their isomerization; however, isoalkanes are preferred because their greater activity permits the reaction to be carried out at lower temperatures.

The reaction conditions under which the process of this invention proceeds will depend largely upon the reactants and the materials utilized therein. The reaction is usually catalyzed by the use of a Friedel-Crafts type compound, the preferred catalysts comprising aluminum chloride, aluminum bromide, zirconium chloride, boron fluoride, etc., although other metallic halides of this class such as ferric chloride and zinc chloride may be used, however, but not necessarily with equivalent results. The catalyst is usually used in amount corresponding to at least one-third mole of catalyst per mole of phosphorus trichloride used. Generally speaking, temperatures ranging from about −20° to about +150° C. or more will be used in the reaction. When aluminum chloride is used to catalyze the reaction, the temperature is in the range of from about —20° to about +125° C., the preferred range being from about 20° to about 100° C. The reflux temperature at atmospheric pressure of the reaction mixture is often a satisfactory temperature.

The reaction may be effected in any suitable manner and may comprise either a batch or a continuous type operation. When a batch type operation is used, a quantity of the aromatic compound, the saturated hydrocarbon and the catalyst are placed in an appropriate reaction apparatus such as a vessel equipped with a mixing device and maintained at the predetermined temperature. A solution of the phosphorus trichloride in excess aromatic hydrocarbon is then added gradually to the well-stirred mixture. Alternatively, the reactants and catalyst are mixed and heated under reflux for the desired length of time, usually from about 0.5 to 10 hours or even longer. At the end of the reaction time, the vessel and contents thereof are allowed to come to room temperature and the desired reaction products, namely, the monoaryl phosphines and diaryl phosphines, and the alkylbenzene are isolated by treating the product with ice-water and alkali, and separating the organic layer, which is then washed, dried, and subjected to fractional distillation.

Inasmuch as the arylphosphines are readily oxidized by contact with air, it is essential that the reaction and subsequent operations be carried out under oxygen-free nitrogen, carbon dioxide or other inert atmospheric conditions.

Another type of operation comprises the continuous type. In this operation the starting materials comprising the aromatic compound, the saturated hydrocarbon, the phosphorus trichloride and the catalyst are continually charged to a reaction zone which is maintained at the proper operating conditions of temperature and pressure. The reaction zone may comprise an unpacked vessel or coil, or may contain an adsorbent packing material such as dehydrated bauxite, fire brick, alumina or the like. The aforementioned starting materials may, if so desired, be introduced into the reaction zone in separate streams or the aromatic hydrocarbon and the phosphorus trichloride may be added in one stream and the catalyst and the saturated hydrocarbon in another. Another type of continuous operation comprises a fixed bed type in which the Friedel-Crafts type catalyst is disposed as a bed in the reaction zone, while the reactants are passed therethrough in a continuous stream in either an upward or downward flow. The reaction will continue until a desired time has elapsed, after which time the reaction products will be continually withdrawn from the reaction zone, and the desired products, the monoarylphosphines, the diarylphosphines, separated therefrom in the manner outlined above. The unreacted starting materials may be recycled for use as a portion of the feed stock while the reaction products are purified by conventional means.

Other continuous type of processes which may be used in this invention include the fluidized type of operation, the compact moving bed type of operation, and the slurry type process.

The following examples are given to illustrate the process of this invention which, however, are not intended to limit the generally broad scope of the invention in strict accordance therewith.

*Example I*

90 g. of phosphorus trichloride dissolved in 200 g. of benzene is added during a period of approximately 2 hours to a stirred mixture of 200 g. of benzene, 200 g. of methylcyclohexane and 65 g. of aluminum chloride maintained at a temperature of approximately 75° C. in an oxygen-free nitrogen atmosphere. The reaction mixture is stirred for an additional 2 hours at the aforementioned temperature after which the product is treated with ice-water, the upper layer is separated, washed with water and dilute alkali, dried and subjected to fractional distillation under reduced pressure. Cuts boiling at 160–163° C. (760 mm.), 240–242° C. (760 mm.), and at about 280–282° C. (760 mm.) comprising phenylphosphine, methylcyclohexylbenzene and diphenylphosphine, respectively, are separated from the reaction product.

*Example II*

A solution of 90 g. of phosphorus trichloride dissolved in 200 g. of α- and β-methylnaphthalene is added during a period of approximately 2 hours to a stirred mixture of 200 g. of the methylnaphthalenes, 200 g. of 2- and 3-methylpentane and 65 g. of aluminum chloride, said mixture being maintained at a temperature of 40–70° C. The reaction is stirred for an additional 4 hours at this temperature after which the product is treated with water and alkali, the organic layer is separated, washed with water and dilute alkali, dried and subjected to fractional distillation under reduced pressure. The reaction products comprising methylnapthylphosphine bis(methylnapththyl)phosphine and (methyl)(hexyl)naphthalene are separated from unreacted starting materials.

I claim as my invention:

1. A process for the preparation of a phosphine containing at least one aryl substituent and not more than two aryl substituents which comprises reacting an aromatic compound selected from the group consisting of lower alkyl benzenes, lower alkyl naphthalenes, benzene, naphthalene, anthracene, and phenanthrene with phosphorus trichloride and a saturated hydrocarbon containing a tertiary carbon atom in an inert atmosphere and at a temperature from about —20° to about 150° C. in the presence of a Friedel-Crafts type catalyst, and recovering the resultant arylphosphine.

2. The process of claim 1 further characterized in that said saturated hydrocarbon is an isoparaffin.

3. The process of claim 1 further characterized in that said saturated hydrocarbon is a cycloparaffin.

4. The process of claim 1 further characterized in that said saturated hydrocarbon is isopentane.

5. The process of claim 1 further characterized in that said saturated hydrocarbon is an alkylcycloparaffin.

6. The process of claim 1 further characterized in that said saturated hydrocarbon is methylcyclohexane.

7. A process for the preparation of an aryl phosphine which comprises reacting benzene with phosphorus trichloride in an inert atmosphere and at a temperature from about —20° to about 150° C. in the presence of aluminum chloride and isopentane, and recovering the resultant phenylphosphine and diphenylphosphine.

8. A process for the preparation of an aryl phosphine which comprises reacting a naphthalene with phosphorus trichloride in an inert atmosphere and at a temperature from about —20° to about 150° C. in the presence of aluminum chloride and an isoparaffin, and recovering the resultant naphthylphosphine and dinaphthylphosphine.

9. A process for the preparation of an aryl phosphine which comprises reacting toluene with phosphorus trichloride in an inert atmosphere and at a temperature from about —20° to about 150° C. in the presence of aluminum chloride and methylcyclohexane, and recovering the resultant tolylphosphine and ditolylphosphine.

10. A process for the preparation of an aryl phosphine which comprises reacting methylnaphthalene with phosphorus trichloride in an inert atmosphere and at a temperature from about —20° to about 150° C. in the presence of aluminum chloride and isopentane, and recovering the resultant methylnaphthylphosphine and bis-(methylnaphthyl)phosphine.

11. A process for the preparation of an aryl phosphine which comprises reacting benzene with phosphorus trichloride in an inert atmosphere and in the presence of aluminum chloride and methylcyclohexane at a temperature in the range of from about —20° to about +125° C., and recovering the resultant phenylphosphine and diphenylphosphine.

No references cited.